UNITED STATES PATENT OFFICE.

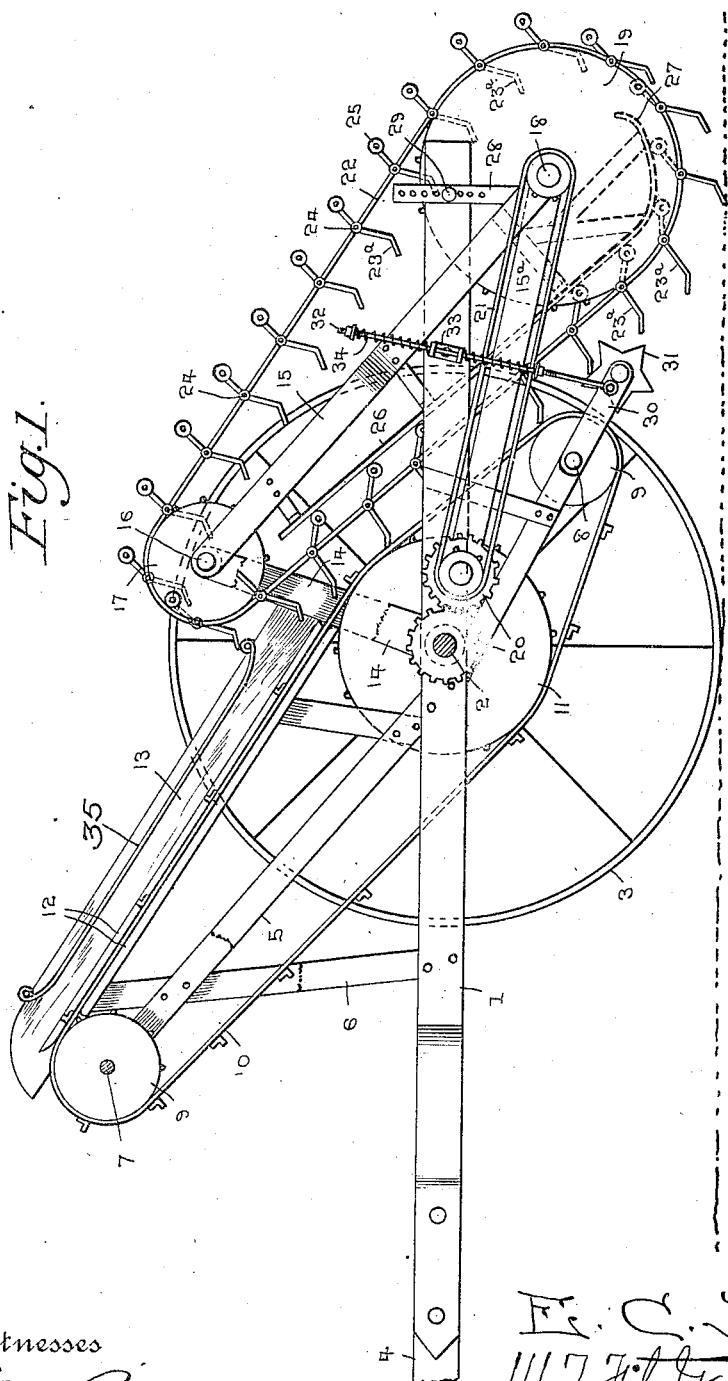

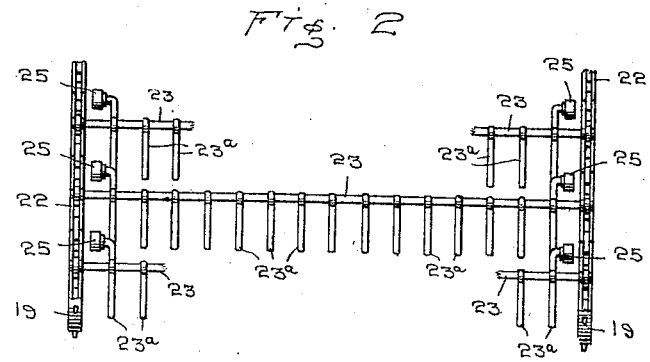
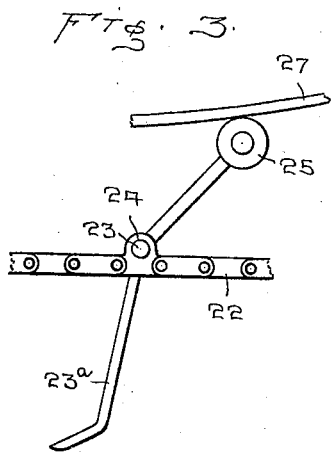

EDWARD C. HELMKE, OF MACFARLAND, WISCONSIN.

STONE-GATHERING MACHINE.

1,139,032.  Specification of Letters Patent.  Patented May 11, 1915.

Application filed May 2, 1914. Serial No. 835,802.

*To all whom it may concern:*

Be it known that I, EDWARD C. HELMKE, a citizen of the United States, residing at Macfarland, in the county of Dane and State of Wisconsin, have invented certain new and useful Improvements in Stone-Gathering Machines; and I do hereby declare the following to be a full, clear, and exa description of the invention, such as will enable others skilled in the art to which it appertains to make and use the same.

An object of this invention is the provision of a machine to traverse fields or roadways to gather loose stones therefrom and deposit the same in a suitable vehicle or receptacle.

Another object of the invention is to provide a machine of this character having means for crushing clods of earth picked up thereby.

Other objects and advantages will be hereinafter more specifically set forth, claimed and illustrated in the accompanying drawings, in which, Figure 1, represents a side elevation of a machine partly broken away, Fig. 2, is a plan view of the rake mechanism, and, Fig. 3, is an enlarged detail elevational view of one of my rake teeth.

Referring to the drawing in detail wherein similar reference numerals designate corresponding parts throughout the views, the numeral 1 indicate the side rails of the vehicle frame which are secured in spaced relation and receive adjacent the center thereof the axle 2 carrying suitable wheels 3 and converge at their forward ends and are connected with a suitable tongue 4 adapted to be connected with a suitable vehicle. A pair of supporting beams 5 are secured to the side rails 1 adjacent the axle 2 and extend from a point forwardly and above said axle to a point rearwardly and below the latter and are suitably braced at their forward ends by brace beams 6. Shafts 7 and 8 are mounted in the upper and lower ends respectively of the beams 5 and carry rollers 9 over which travels an endless conveyer 10 which is provided with a plurality of parallel transverse ribs as clearly shown in Fig. 1. A sprocket or other drive wheel 11 is keyed to the axle 2 and is disposed between the parallel portions of the endless conveyer 10 between the shafts 7 and 8, for operating said conveyer. The upper portion of the conveyer 10 travels between and is supported by guide strips 12 carried by the side boards 13 arranged on opposite sides thereof.

Beams 14 are pvioted to the axle 2 and are secured at their upper ends to downwardly extending beams 15 which are bifurcated at their lower ends and which connect with horizontal beams 15$^a$ also pivotally connected with the axle 2. A shaft 16 extending transversely of the machine and through the arms 14 and beams 15 rotatably supports a pair of spaced sprocket wheels or pulleys 17. The lower ends of the beams 15 are connected by a shaft 18 carrying a pair of spaced sprocket wheels or pulleys 19 of considerably greater diameter than the wheels 17, the said wheels 19 being seated in the bifurcated ends of the beams 15 and being adapted to be driven from the axle 2 by a pair of gears 20 and a chain or belt 21. A conveyer 22 is adapted to travel over the pairs of wheels or pulleys 17 and 19 and carries a plurality of pivoted rake-bars 23 provided with angular teeth 23$^a$ rigidly connected thereto and adapted to swing with said rake-bars about the pivot 24. The two outermost teeth of each rake-bar are extended a distance past their connecting point and are each provided with a rotatable roller 25 adapted to engage a guide rod 26 having a curved lower end 27 and adapted to maintain rake-bars 23 in proper operative position. The rear ends of the bars 15 are adjustably supported by straps 28 having a plurality of vertically alined openings therein adapted to receive a bolt or the like 29 for securing the bars 15 in adjusted position to the side rails 1.

A pair of arms 30 are pivoted over the shaft 8 to the lower ends of the beams 5 and rotatably support at their lower end a roller having a plurality of blades 31 adapted to coöperate with the teeth 23$^a$ after the teeth have lifted the stones from the ground to more efficiently direct and deposit the stones upon the receiving end of the endless conveyer 10. Rods 32 are connected adjacent the lower ends of the arms 30 and are slidably mounted through suitable brackets 33, and springs 34 are mounted on said rod on each side of said brackets 33 for resiliently supporting the arms 30 in operative position.

A sheet of wire mesh or the like 35 is secured between the side boards 13 in spaced relation to the conveyer 10 and is adapted to coöperate with the latter in crushing clods of earth carried upwardly thereby.

The operation of my device will become more apparent from the following: The device may be drawn along the ground by any suitable power. The turning of the master wheels 3, revolving the axle 2 and the sprocket wheels 11, moves the upper surface of the endless conveyor 10 in an upward and forward direction. The under surface of the conveyer 22, carrying the pivoted rake-bars 23, is moved in an upward and forward direction by the sprocket wheels 19, rotated in a rearward direction by the belt or chain 21 connected with the sprocket wheels 20 driven by the axle 2. The teeth 23$^a$ assume approximately a vertical position on their downward movement toward the ground, but prior to reaching the ground, the rollers 25 of the teeth contact with the curved end 27 of the guide rods 26 whereupon the teeth 23$^a$ begin to assume a horizontal position. The further movement of the teeth will gather all stones in the path of the device, the teeth at this point assuming approximately a horizontal position, whereby the stones are gathered and carried upwardly from the ground by the teeth toward the receiving end of the conveyer 10. Just prior, however, to reaching the end of the conveyer 10 the blades 31 of the roller contact with the outer surfaces of the stones in the adjacent teeth and coöperate with the teeth for efficiently directing and depositing the stones upon the receiving end of the conveyer 10. The ends of the teeth afterward engaging the lower portion of the conveyer 10 for a distance, carry the stones in the direction of the delivering end of the conveyer 10 where the stones are discharged into a wagon or other suitable receptacle for receiving the stones.

While in the foregoing I have illustrated in the drawings, and described in the specification such combination and arrangement of elements as constitute the preferred embodiment of my stone-gatherer and clod-crusher I desire to emphasize the fact that I may make such alterations in the structure above set forth in later adaptations of my device as shall be limited by a just interpretation of this invention as defined by the appended claims.

What I claim as new:

1. A stone gathering machine comprising a wheeled frame, an endless conveyer extending forwardly and upwardly from said frame, an endless belt adapted to travel rearwardly of said conveyer, rakes on said belt, and resiliently mounted means adapted to coöperate with said rakes to deposit stones on said endless conveyer.

2. A stone gathering machine comprising a wheel mounted frame, an endless conveyer thereon extending upwardly and forwardly therefrom, a frame pivotally supported at its front end to the axis of said wheels, means for adjustably supporting the rear end of said frame, an endless belt adapted to travel in said frame in proximity to said endless conveyer, rake bars carried by said belt, and means adapted to coöperate with said rakes to deposit stones on said endless conveyer.

3. A stone gathering machine comprising a wheel mounted frame, an endless conveyer extending upwardly and forwardly therefrom, a frame pivoted at its forward end to the axis of the wheels of said frame, means adjustably supporting the rear end of said frame, belts adapted to travel in said frame, rakes on said belt, and a roller having longitudinal blades adapted to coöperate with said rakes to deposit stones upon said endless conveyer.

4. A stone gathering machine comprising a wheel mounted frame, an endless conveyer thereon extending upwardly and forwardly therefrom, a frame pivotally supported at its front end to the axle of said wheels, means for adjustably supporting the rear end of said frame, an endless belt adapted to travel in said frame in proximity to said endless conveyer, rake-bars carried by said belt, teeth attached to said rake-bars, and means adapted to coöperate with said toothed rake-bars to deposit stones on said endless conveyer.

5. A stone gathering machine comprising a wheel mounted frame, an endless conveyer thereon extending upwardly and forwardly therefrom, a frame pivotally supported at its front end to the axle of said wheels, means for adjustably supporting the rear end of said frame, an endless belt adapted to travel in said frame in proximity to said endless conveyer, rake-bars pivotally carried by said belt, teeth attached to said rake-bars, and means adapted to coöperate with said toothed rake-bars to deposit stones on said endless conveyer.

6. A stone gathering machine comprising a wheel mounted frame, an endless conveyer thereon extending upwardly and forwardly therefrom, a frame pivotally supported at its front end to the axle of said wheels, means for adjustably supporting the rear end of said frame, an endless belt adapted to travel in said frame in proximity to said endless conveyer, rake bars pivoted to said belt, teeth formed in said rake bars, rollers mounted on outside teeth of said rake bars, and means coöperating with said rakes for directing and depositing stones upon the receiving end of said endless conveyer.

7. A stone gathering machine comprising a wheel mounted frame, an endless conveyer thereon extending upwardly and forwardly therefrom, a frame pivotally supported at its front end to the axis of said wheels, means for adjustably supporting the rear end of said frame, an endless belt adapted to travel in said frame in proximity to said endless conveyer, rake bars pivoted to said belt, teeth formed in said rake bars, rollers mounted on outside teeth of said rake-bars, guide-rods coacting with said rollers, and means coöperating with said rake-teeth for depositing stones on said endless conveyer.

In testimony whereof I have signed my name to this specification in the presence of two subscribing witnesses.

EDWARD C. HELMKE.

Witnesses:
MAGNUS MICKELSON.
SARAH JOHNSON.